Dec. 9, 1924.

L. A. MORRISON

INDUCTANCE OR TUNER

Filed Sept. 18, 1924

1,518,810

INVENTOR
LEWIS A. MORRISON.
BY
J. Granville Meyers
ATTORNEY

Patented Dec. 9, 1924.

1,518,810

UNITED STATES PATENT OFFICE.

LEWIS A. MORRISON, OF NEW YORK, N. Y.

INDUCTANCE OR TUNER.

Application filed September 18, 1924. Serial No. 738,382.

*To all whom it may concern:*

Be it known that I, LEWIS A. MORRISON, a citizen of the United States, and resident of New York city, in the county of New York and State of New York, have invented certain new and useful Improvements in Inductances or Tuners, of which the following is a specification.

My invention relates to inductances for alternating currents and especially for radio-frequency currents. As physically embodied in the example chosen for illustration, the invention consists of a plurality of inductances arranged or especially adapted as a tuner for radio-receivers; that is to say, it is an instrument including a primary inductance, a secondary, and a third inductance usually employed as a feed-back "tickler." In its broader aspect, however, the invention is not limited to use as a tuner or coupler between the antenna or an initial circuit and the secondary circuit of a receiver, but may be used, with or without modification, at various other points in receiver circuits and in fact, is not necessarily limited to use in receivers, but may be employed anywhere in radio equipment where conditions are suitable.

In the present physical embodiment the invention provides not only suitable inductances, but a suitable combination, arrangement or mounting for them, so that they are combined preferably in a self-contained unit or instrument which may be easily and conveniently mounted as such in the proper position in a radio receiver, and easily and quickly connected to other parts of the circuit.

The principal object of the invention is to provide an inductance group or unit of this class which has exceedingly high efficiency, and this result is obtained by so constructing and arranging the inductances and their supports or mounting as to eliminate to a very high degree defects of inductances or tuners commonly used heretofore, such defects involving functional deficiencies usually referred to as "losses" and being due in most cases to excessive distributed capacity in the inductances themselves, to current losses caused by presence of considerable metal bodies in the vicinity of the inductances, and to dielectric absorption losses due to an excessive amount or improper arrangement of the dielectric in contact with or adjacent the inductances.

While within a period of about one year prior to this application great attention has been given to so-called low-loss tuners or inductances, the instruments which have been constructed in an effort to eliminate losses of the character described have, so far as I am aware, attained only partial success, due to failure either to so wind or arrange the coils or inductances as to properly reduce distributed capacity, to the retention of a considerable amount of metal and an excessive amount of dielectric, a notable example of the last item being so called low-loss tuners in which some or all of the inductances are wound upon tubes of bakelite or other more or less efficient dielectric material, involving dielectric absorption losses of a very substantial amount.

The charcteristics of my invention, or the nature, construction and arrangement of the inductances and their mounting by which defects above mentioned are avoided and the advantages or objects also briefly mentioned above are attained, will now be described with reference to the accompanying drawing, which illustrates one exemplifying embodiment of the invention. After considering this embodiment, persons skilled in the art will understand that many variations may be made within the principles of the invention, and I contemplate the employment of any structures or arrangements of parts that are properly within the scope of the appended claims.

Figure 1:
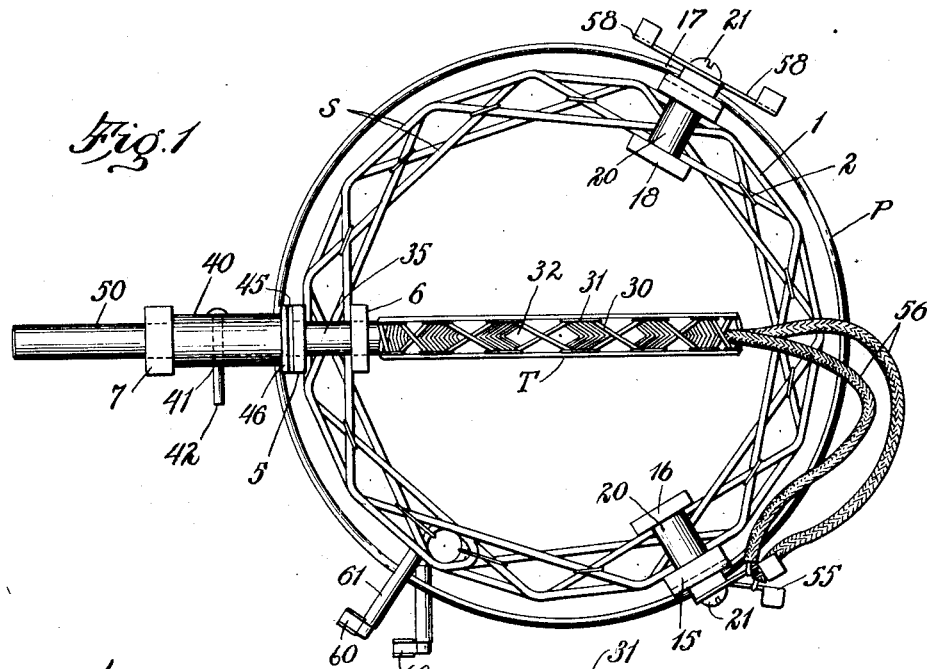
Fig. 1 is a top plan of a "tuner" or "coupler" embodying the invention in one form.

For the sake of brevity the invention will be described as it is here specifically embodied in the structure chosen for exemplification, which is a tuner particularly designed for use in a simple three circuit regenerative receiver, without attempting to point out many variations in structure, arrangement or uses of the invention, a few of such variations, however, being mentioned incidentally by way of examples only.

As specifically embodied, the invention consists of a frame designated generally as F, a primary inductance P, a secondary inductance S, and a regenerative feed back inductance or tickler T. The secondary S is preferably wound in the fashion generally known as "basket winding," in which different portions of the wire constituting the coil cross each other at very substantial angles, so that the distributed capacity, which might otherwise be called the "self-capacity" of the coil, is reduced to a very low value. Specifically, in the present example, the single wire 1 constituting the inductance, is any suitable insulated wire, the insulation being depended on principally to insure against conductive contact of portions of the wire which cross each other. In order to give substantial spacing at such points the covering of the wire is preferably of the character known as "double cotton," although other suitable insulation may be employed. The wire is wound on spaced parallel pegs set in a circle or arranged as elements of a cylinder, and the wire is passed outside two successive pegs, inside the next two successive pegs, outside the next two pegs and so on, producing a coil which is of substantially cylindrical outline with a wall of very substantial thickness composed of the crossing or interlaced wires. In this way the desired electrical efficiency and at the same time very great mechanical strength and rigidity are attained, the last being important as the secondary coil is depended on in this embodiment of the invention to itself form substantially a part of the frame of the complete instrument. When wire of any considerable diameter, say approximately #16 B. & S. gauge (more or less) is used, the secondary coil is very strong and rigid and will not be deformed or otherwise injured even by ordinary rough treatment. The various turns of the winding are sufficiently held together by a thread or cord 2 of moderate diameter passed or woven through the hollow wall of the inductance cylinder, one way of weaving the binding thread being sufficiently understood from the drawing without detail description. Evidently other forms of basket winding may be employed, or the secondary may be in the form of a plain cylindrical single-layer or banked winding.

The secondary is connected to the supporting frame F by two strips of suitable dielectric material, such as hard rubber or bakelite, these being referred to for convenient identification and without necessary limiting significance as "clamping strips" 5 and 6, one located outside and the other inside the coil. Parallel to the clamping strips is another strip 7 of similar material, which may be identified as the front frame strip or panel-mounting strip. Tubular spacers 8 and 9 of suitable or similar dielectric are placed between strips 7 and 5, and 5 and 6, near their upper and lower ends respectively. The spacing tubes 8 serve to properly and rigidly space strip 5 away from strip 7, the object of this being to locate all of the inductances a substantial distance away from the panel 10 of a radio receiver or other analogous appliance. The frame in the present example is so designed that the instrument may be easily and quickly mounted as a self-contained unit on a vertical panel 10, although the instrument can be easily arranged, with or without modifications, for so-called "table mounting."

The spacing sleeves 9 are in line with the respective upper and lower sleeves 8 and are cut slightly shorter than the normal thickness of the hollow cylindrical wall of the secondary inductance. The strips 5, 6 and 7 are secured together by screws 11 which pass through the spacing sleeves 8 and 9 and registering holes in the strips. The screws have flat conical heads fitting in countersinks in the outer face of strip 7 to permit flat contact of the outer face of the strip with the panel, and the threaded ends of the screws may engage directly in threads tapped in the holes in the inner clamping strip 6, to avoid the use of any metal nuts in the vicinity of the inductances. When the screws are turned up tight the inner clamping strip 6 squeezes the hollow wall of the secondary coil S with slight resilient compression against the outer clamping strip 5, this pressure being sufficient to tightly hold the coil in position but insufficient to materially deform it.

For the convenient support of other members and especially the primary inductance, other strips of suitable dielectric material are desirably secured to the secondary coil S, which then serves as an intermediate frame structure and when constructed substantially as described has ample strength and rigidity for this purpose.

Specifically, in the present example, there are two additional pairs of strips, 15 and 16, and 17 and 18, respectively, the two pairs being spaced an equal distance from the clamping strips 5 and 6, or the three pairs of strips being located, as clearly shown in Fig. 1, at 120° intervals around the circle defined by the secondary. The pairs of strips 15—16 and 17—18 may also be defined as "clamping strips," or, in distinction from strips 5 and 6, and because they serve principally to support the primary inductance and terminals, they may be distinguished as "supporting strips." The two strips of each pair are spaced by tubular dielectric spacers 20, dimensioned like spacers 9, and the strips are secured together by screws 21 passing through the spacers and registering holes in the strips and engaging threads cut in the holes in the inner strips 16 and 18, so that when the screws are turned up tight, the strips are tightly clamped on inner and outer faces of the secondary winding with resilient effect, as sufficiently explained in connection with the clamping strips.

The primary inductance P, however formed or constructed, is usually located outside the outer supporting and clamping strips 5, 15 and 17, one object of this arrangement being to give a considerable loose-coupled effect, or to reduce to a desirable extent the intensity of the inductive action between the primary and secondary. When the strips 5, 15 and 17 are made of substantial and convenient thickness for mechanical strength and other reasons, it is found that the spacing between the primary and secondary coils is sufficient to give the desired loose-coupling, which in turn permits close tuning of the secondary and great selective effect in tuning to a particular wave-length with the elimination of others, without any considerable sacrifice of signal strength. Otherwise, the primary can be arranged for adjustable coupling in general conformity with the tickler arrangement presently to be described, or in any other suitable way.

The primary when arranged in fixed position about the secondary may be variously constructed or arranged, but most desirably, as here shown, it consists of a single wire 25 of substantial gauge, say approximately #12 B. & S. gauge (although the diameter may be varied within wide limits), wound in the form of a single-layer cylindrical helix with widely spaced turns. The spacing of the turns provides ample air insulation and avoids the necessity for any other dielectric and the wire is therefore preferably uncovered, with the most complete possible avoidance of dielectric loss. When the wire is of considerable diameter, it may be sufficiently stiff after winding to retain its form and to hug the strips 5, 15 and 17 tightly enough to retain itself in proper form without definite retaining means. Preferably, however, the primary coil is definitely located and its turns are definitely retained in proper spaced relation by cutting shallow slots 26 at proper intervals in the outer faces of strips 5, 15 and 17, these slots or grooves being cut diagonally at angles corresponding to the pitch of the helix 25. The coil 25 is so formed initially that when it is placed over the strips and sprung into position, the individual turns snap into the grooves 26 to a greater or less extent. Preferably, the width of the grooves is less than the diameter of the wire, so that only moderate segments of the wire enter the grooves and the bulk of the wire stands outside the strips. In this way the actual contact of the primary wire with the dielectric material is limited to thin lines, which are the outer edges of the grooves, and dielectric losses are reduced probably to an absolute minimum, or at least are as nearly negligible as appears to be possible in apparatus of this class. When located and secured in the described manner the primary winding is very firmly held in position and in fact it cannot be bent or dislocated by any reasonable or even rough treatment.

A third inductance, which may be used as a feed-back coil or "tickler" may be supplied or omitted as desired. In the present embodiment of the invention such an inductance is provided for as follows: The inductance T may be of almost any form, but conveniently, in the present example, it is in the form of a low-loss self-supporting spider-web coil consisting of a single wire 30 wound on radial pegs in the same style of winding followed with respect to the secondary; that is, the wire is passed outside two successive pegs then between adjacent pegs and outside the next two successive pegs, back to the other side and so on, resulting in flat sides and a hollow interior consisting of crossing wires, as sufficiently illustrated in Fig. 1, such coils having great mechanical strength as well as very low distributed capacity. The turns are sufficiently held together by a cord or thread 31 without the necessity for any other mechanical support or fastening. This type of coil also provides radial spaces as at 32 through one of which a supporting rod may be passed. This supporting rod or shaft 35 preferably consists of a suitable dielectric material such as hard rubber or bakelite. It passes through one of the spaces 32 and terminates adjacent the other side of the coil and for better bracing may be in contact with the inner turns of the wire at that point, although that is not essential. The cord 31 which binds the turns together may be passed through a hole 36 in the end of the rod to definitely locate the outer portion of the coil.

Strips 5, 6 and 7 are extended above the secondary S far enough to provide bearing supports for rod 35 which passes with a close bearing fit through holes in the strips. The tickler shaft 35 is secured against end play by a tubular spacer 40 of a suitable dielectric material located between strips 5 and 7. The shaft passes through the spacer and is secured by a pin 41 which passes through the spacer and the rod and locks them together. One end 42 of the pin projects substantially from the spacer tube and acts as a stop by contact with the adjacent spacer 8 to limit the rotative movement of the tickler. This is desirable, when, as is preferred, the tickler is provided with flexible or "pigtail" connections later referred to.

Figure 2:
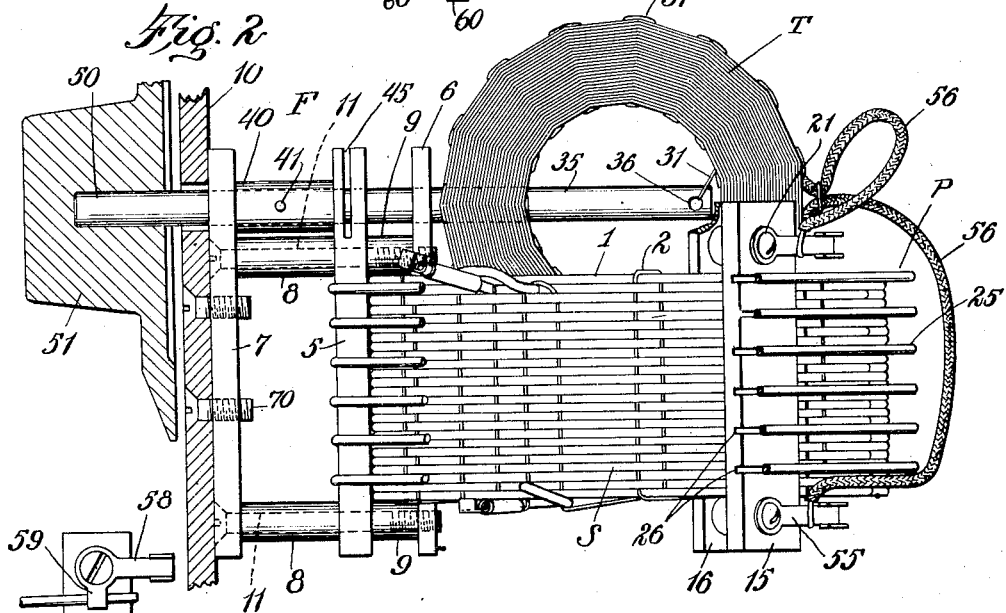
Fig. 2 is a side elevation of the same, with some parts broken away.
Figure 3:
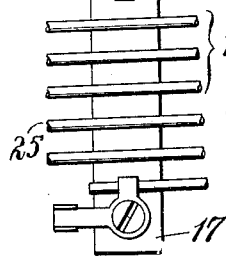
Figs. 3 and 4 are detail views, illustrating mainly the mounting of the primary inductance and its terminals.
Figure 4:
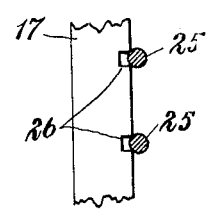

Since a free bearing for the tickler shaft is desirable, to provide for easy rotation, and also a reasonable tightness of the bearing is desirable to prevent accidental movement of the tickler or annoying lost motion, means are provided for taking up such play and frictionally resisting the turning of shaft 35 to a desirable extent as follows: A slot 45 is cut from the upper end of strip 5 inward to a point considerably below the lower side of the tickler shaft, this slot being parallel to the greatest width of the strip and preferably nearer one side of the strip than the other, as clearly shown in Figs. 1 and 2. This provides a thin, resilient or flexible strip portion 46. The spacing tube 40 is cut slightly longer than the normal distance between strips 5 and 7 so that when the screws 11 are tightened the flexible strip segment 46 is deflected slightly and bears resiliently against the end of the spacing tube. In this way substantial yielding friction is supplied to resist turning movement of shaft 35 and hold it in adjusted position, the shaft being firmly secured to the spacer by the pin 41.

The outer end 50 of shaft 35 is long enough to project considerably beyond the outer face of a panel 10 of ordinary thickness, and a knob 51 is placed and secured on the shaft in the usual way.

In addition to other clamping and supporting functions, certain of the vertical strips and especially the pairs 15—16 and 17—18 desirably serve as terminal supports. Thus, the heads of screws 21 which secure strips 15 and 16 together, are used to clamp winged terminals 55 to the outward faces of strip 15. Flexible conductors or "pigtails" 56 are connected to the two ends of the tickler wire, usually at a point in line with shaft 35, and the opposite ends of these pigtails are soldered to the respective terminals 55. Similarly, screws 21, which clamp strips 17—18 together, secure terminals 58 to the outer face of strip 17. These clips have lugs 59 overlying adjacent ends of the primary wire 25, to which the lugs are soldered. Suitable leads or wires of the secondary and tickler circuits of the receiver can be quickly and easily inserted and soldered in the outer ends of the terminals or clips 55 and 58. Similar terminals could be provided for the ends of the secondary; otherwise, as here shown, the ends of the secondary winding are simply brought out at convenient points, and winged terminals 60 are soldered to them; and when necessary or desirable, sleeves 61 of insulating material are placed over the secondary wires where they cross adjacent the primary to avoid accidental metallic contact.

For panel mounting, strip 7 is provided with threaded holes to receive screws 70 in accordance with the usual style of panel mounting, or the appliance may be placed on a baseboard with suitable brackets, or in fact may stand upon the lower ends of the clamping and supporting strips.

The functional advantages of the invention will be sufficiently understood by experts without elaborate explanation. It is sufficient to mention as a brief summary that, aside from the wire necessarily employed in the inductances themselves, there is a very small number of metal parts in the entire structure, these consisting practically only of the screws 11 and 21, and terminals 55 and 58 which are parts of the electric circuits. The metal screws could, of course, be replaced by pins or other devices of dielectric material, but the metal parts employed are so few in number and so small and are so located that they cause no appreciable losses. All except the almost negligible part of the frame structure represented by the metal screws consists of dielectric material, which, of course, produces no stray or inductive currents such as are caused by substantial metal bodies adjacent inductances. The dielectric material is furthermore arranged so that exceedingly small portions of it are in actual contact with the inductances, and the total bulk of dielectric in the neighborhood of the inductances is moreover very small. Dielectric absorption losses are therefore reduced practically to a minimum and it is found in actual practice that when this tuner is inserted in a suitable receiving circuit, the other components of which are of reasonably high efficiency, a remarkably high degree of selectivity is realized, with great signal strength, and in fact the instrument probably represents approximately the maximum of efficiency that can be attained in an appliance of this class.

The employment of a rotor shaft 35 of dielectric material, such as bakelite, as in the preferred construction, is of great importance, because it eliminates current losses, hand-capacity effects, and other objectionable features of metal shafts. When the various parts and apertures of the mounting are accurately dimensioned or machined a correct and smooth turning mounting for the shaft, without lost motion, is provided, without the necessity for any metal parts in the shaft itself or its bearings.

I claim:

1. Inductance apparatus of the class described, comprising an inductance coil of substantially rigid and self-supporting form, a frame, clamping strips of dielectric material connecting the coil to the frame, other strips of dielectric material secured to and supported by the coil in spaced relation to each other and the clamping strips, and another inductance surrounding the first inductance and strips and supported by the latter in spaced relation to the first inductance.

2. Inductance apparatus of the class described, comprising an inductance coil of substantially rigid and self-supporting form, a frame of dielectric material, narrow clamping strips of dielectric material connecting the coil to the frame, other narrow strips of dielectric material secured to and supported by the coil in spaced relation to each other and the clamping strips, and another inductance of substantially cylindrical, helical form surrounding the first inductance and strips and supported by the latter in spaced and loose-coupled relation to the first inductance.

3. Inductance apparatus of the class described, comprising an inductance coil of substantially rigid and self-supporting form, a frame, clamping strips of dielectric material connecting the coil to the frame, other strips of dielectric material secured to and supported by the coil in spaced relation to each other and the clamping strips, another inductance surrounding the first inductance and strips and supported by the latter in spaced relation to the first inductance, and metallic terminals supported by certain of the strips and connected to ends of certain of the inductances.

4. Inductance apparatus of the class described, comprising an inductance coil of substantially rigid and self-supporting form, a frame, clamping strips of dielectric material connecting the coil to the frame, other strips of dielectric material secured to and supported by the coil in spaced relation to each other and the clamping strips, another inductance surrounding the first inductance and strips and supported by the latter in spaced relation to the first inductance, a shaft rotatably mounted in the frame, and an inductance on said shaft in adjustable inductive relation to the inductance first mentioned.

5. Inductance apparatus of the class described, comprising an inductance coil of substantially rigid and self-supporting form, a frame, clamping strips of dielectric material connecting the coil to the frame, other strips of dielectric material secured to and supported by the coil in spaced relation to each other and the clamping strips, another inductance surrounding the first inductance and strips and supported by the latter in spaced relation to the first inductance, a shaft rotatably mounted in bearing apertures in said frame and clamping strips, and an inductance of substantially self-supporting form on said shaft in adjustable inductive relation to the inductance first mentioned.

6. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-suporting form passing at one point between the clamping strips, means holding the clamping strips together to firmly clamp the inductance, means supporting and spacing the clamping strips in relation to the supporting member, additional strips of dielectric material parallel and in spaced relation to each other and to the clamping strips and secured to the outer face of the inductance, and another inductance surrounding the first-named inductance and supported by outer faces of the outer clamping strip and the other strips, which space the last-named inductance in loose-coupled relation to the first.

7. Inductance apparatus of the class described, comprising a panel-strip of dielectric material adapted to be placed against and secured to a support such as a panel, a pair of clamping strips of dielectric material in spaced and parallel relation to each other and said panel-strip, a secondary inductance of substantially cylindrical, self-supporting form passing at one point between the clamping strips, means urging the clamping strips together to firmly clamp the inductance, means supporting and spacing the clamping strips in relation to the panel-strip, additional strips of dielectric material in spaced relation to each other and the clamping strips and secured to the outer face of the inductance, and a primary inductance in substantially cylindrical, helical form with spaced bare turns surrounding said secondary inductance and supported by outer faces of the clamping and other strips which space the primary inductance in loose-coupled relation to the secondary.

8. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, means supporting and spacing the clamping strips in relation to the supporting member, additional strips of dielectric material parallel and in spaced relation to each other and to the clamping strips and secured to the outer face of the inductance, and another inductance surrounding the first-named inductance and supported by outer faces of the outer clamping strip and the other strips, which space the last-named inductance in loose-coupled relation to the first, the dielectric strips supporting the second-named inductance having spaced grooves engaging the turns of that inductance to maintain them in proper spaced relation.

9. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, means supporting and spacing the clamping strips in relation to the supporting member, additional strips of dielectric material parallel and in spaced relation to each other and to the clamping strips and secured to the outer face of the inductance, and another inductance surrounding the first-named inductance and supported by outer faces of the outer clamping strip and the other strips, which space the last-named inductance in loose-coupled relation to the first, the dielectric strips supporting the second-named inductance having spaced grooves engaging the turns of that inductance to maintain them in proper spaced relation, the grooves being narrower than the diameter of the primary wire so that the wire engages only outer edges of the grooves.

10. Inductance apparatus of the class described, comprising a panel-strip of dielectric material adapted to be placed against and secured to a support such as a panel, a pair of clamping strips of dielectric material in spaced and parallel relation to each other and said panel-strip, a secondary inductance of substantially cylindrical, self-supporting form passing at one point between the clamping strips, means urging the clamping strips together to firmly clamp the inductance, means supporting and spacing the clamping strips in relation to the panel-strip, additional strips of dielectric material in spaced relation to each other and the clamping strips and secured to the outer face of the inductance, and a primary inductance in substantially cylindrical, helical form with spaced bare turns surrounding said secondary inductance and supported by outer faces of the clamping and other strips, which space the primary inductance in loose-coupled relation to the secondary, the dielectric strips supporting the primary inductance having spaced diagonal grooves engaging the turns of the second-named inductance to maintain them in proper relation.

11. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, means supporting and spacing the clamping strips in relation to the supporting member, additional strips of dielectric material parallel and in spaced relation to each other and to the clamping strips and secured to the outer face of the inductance, and another inductance surrounding the first-named inductance and supported by outer faces of the outer clamping strip and the other strips, which space the last-named inductance in loose-coupled relation to the first, the supporting member and the clamping strips extending above one end of the first-named inductance, a shaft passing through bearing holes in the strips, an inductance mounted on the shaft, one of said strips being split to provide a flexible member and a spacer surrounding the shaft between said flexible member and another of the strips and dimensioned to stress the flexible member to provide frictional resistance to shaft rotation.

12. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, means supporting and spacing the clamping strips in relation to the supporting member, the supporting member and the clamping strips extending above one end of the inductance, a shaft passing through bearing holes in the strips, an inductance mounted on the shaft, one of said strips being split to provide a flexible member, and a spacer surrounding the shaft between said flexible member and another of the strips and dimensioned to slightly deflect the flexible member to provide frictional resistance to shaft rotation.

13. Inductance apparatus of the class described, comprising a supporting member adapted to be placed against and secured to a support such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, means supporting and spacing the clamping strips in relation to the supporting member, the supporting member and the clamping strips extending above one end of the inductance, a shaft passing through bearing holes in the strips, one of said strips being split to provide a flexible member, and a spacer surrounding the shaft between said flexible member and another of the strips and dimensioned to slightly deflect the flexible member to provide frictional resistance to shaft rotation, and a pin passing through the shaft and the spacer to secure them together and having a portion acting as a stop with an adjacent portion of the supporting frame.

14. Inductance apparatus of the class described, comprising an inductance coil of substantially cylindrical basket form having its wall composed of various portions of the inductance wire crossing each other at angles and providing polygonal inner and outer faces, and a plurality of pairs of strips of dielectric material spaced about the inductance, each pair including an inner and outer strip clamped together at opposite ends to slightly compress and securely hold inner and outer wall faces of the inductance, and a supporting frame structure of dielectric material secured to one of the pairs of strips.

15. Inductance apparatus of the class described, comprising an inductance coil of substantially cylindrical basket form having its wall composed of various portions of the inductance wire crossing each other at angles and providing polygonal inner and outer faces, and a plurality of pairs of strips of dielectric material spaced about the inductance, each pair including an inner and outer strip clamped together at opposite ends to slightly compress and securely hold inner and outer wall faces of the inductance, and a supporting frame structure of dielectric material secured to one of the pairs of strips, the other pairs of strips being supported by the inductance, and another inductance surrounding the one first-named and the outer ones of all the pairs of strips and supported thereby.

16. A tuner unit adapted to be inserted as such in a complete radio apparatus, said unit comprising a secondary inductance, a frame composed substantially of dielectric material with a negligible amount of metal and secured to the secondary inductance and having only small areas of the dielectric in contact therewith, other strips of dielectric material in spaced relation to each other and to the supporting frame and secured to the secondary inductance and supported only thereby, and a primary inductance encircling the outer dielectric strips in loose-coupled relation to the secondary inductance.

17. A tuner unit adapted to be inserted as such in a complete radio apparatus, said unit comprising a secondary inductance, a frame composed substantially of dielectric material with a negligible amount of metal and secured to the secondary inductance and having only small areas of the dielectric in contact therewith, other strips of dielectric material in spaced relation to each other and to the supporting frame and secured to the secondary inductance and supported only thereby, and a primary inductance encircling the outer dielectric strips in loose-coupled relation to the secondary inductance, the turns of the primary inductance having very small areas of contact with the dielectric material.

18. A tuner unit adapted to be inserted as such in a complete radio apparatus, said unit comprising a secondary inductance, a frame composed substantially of dielectric material with a negligible amount of metal and secured to the secondary inductance and having only small areas of the dielectric in contact therewith, other strips of dielectric material in spaced relation to each other and to the supporting frame and secured to the secondary inductance and supported only thereby, and a primary inductance encircling the outer dielectric strips in loose-coupled relation to the secondary inductance, a shaft turnable in bearings in the frame, and an inductance on the shaft adjacent one end of the secondary inductance.

19. Inductance apparatus of the class described, comprising an inductance coil of substantially rigid and self-supporting form, pieces of dielectric material connected to support the coil and also arranged for mounting in radio apparatus, narrow supporting members of dielectric material secured to and supported by the coil in spaced relation to each other and said pieces, and another inductance supported by said members in spaced relation to the first inductance.

20. Inductance apparatus of the class described, comprising an inductance coil of substantially rigid and self-supporting form, strips of dielectric material connected to support the coil, another inductance supported by the first inductance, a shaft rotatably mounted in portions of said strips extending beyond the first inductance, and an inductance on said shaft in adjustable inductive relation to the inductance first mentioned.

21. Inductance apparatus of the class described, comprising an inductance coil of substantially rigid and self-supporting form, clamping strips of dielectric material connected to support the coil and also arranged for panel mounting, another inductance surrounding the first inductance and supported by the latter, a shaft rotatably mounted in bearing apertures in the clamping strips, and an inductance of substantially self-supporting form on said shaft in adjustable inductive relation to the inductance first mentioned.

22. Inductance apparatus of the class described, comprising an inductance coil of substantially rigid and self-supporting form, a frame, clamping strips of dielectric material connecting the coil to the frame, narrow members of dielectric material secured to and supported by the coil in spaced relation to each other and the clamping strips, another inductance supported by said narrow members in spaced relation to the first inductance, a shaft rotatably mounted in the frame, and an inductance on said shaft in adjustable inductive relation to the inductance first mentioned.

23. Inductance apparatus of the class described, comprising a supporting member adapted to be placed against and secured to a support, such as a panel, a pair of clamping strips of dielectric material in spaced and parallel relation to each other and said supporting member, an inductance of substantially cylindrical, self-supporting form passing at one point between the clamping strips, means holding the clamping strips together to firmly clamp the inductance, narrow members of dielectric material parallel and in spaced relation to each other and to the clamping strips and supported by the inductance, another inductance supported by said members in loose-coupled relation to the first inductance, the supporting member and a clamping strip extending above one end of the first named inductance, a shaft passing through bearing holes in the support and strip, and an inductance mounted on the shaft.

24. A tuner unit adapted to be inserted as such in a complete radio apparatus, said unit comprising a secondary inductance, a frame composed substantially of dielectric material with a negligible amount of metal and secured to the secondary inductance and having only small areas of the dielectric in contact therewith, strips of dielectric material in spaced relation to each other and to the supporting frame and secured to the secondary inductance and supported only thereby, and a primary inductance supported by the dielectric strips in loose-coupled relation to the secondary inductance.

25. A tuner unit adapted to be inserted as such in a complete radio apparatus, said unit comprising a secondary inductance, a frame composed substantially of dielectric material with a negligible amount of metal and secured to the secondary inductance and having only small areas of the dielectric in contact therewith, strips of dielectric material in spaced relation to each other and to the supporting frame and secured to the secondary inductance and supported thereby, a primary inductance supported by the dielectric strips in loose-coupled relation to the secondary inductance, a shaft turnable in bearings in the frame, and an inductance on the shaft adjacent one end of the secondary inductance.

26. An inductance unit comprising an inductance of substantially rigid, self-supporting form, a frame of dielectric material supporting the inductance and having a part extending beyond it at one end, a shaft of dielectric material adjacent one end of the inductance, a bearing support for the shaft in said frame part, and an inductance mounted on said shaft and supported thereby in movable inductive relation to the first inductance.

27. An inductance unit comprising an inductance of substantially rigid, self-supporting cylindrical form, strips of dielectric material supporting the inductance and extending beyond it at one end, a shaft of dielectric material in substantially diametral relation to the inductance near one end thereof, a bearing support for the shaft in extended portions of said strips, and an inductance of substantially rigid, self-supporting form mounted on said shaft and supported only by the shaft in movable inductive relation to the first inductance.

28. Inductance apparatus of the class described, comprising spaced supporting strips of dielectric material, an inductance supported thereby, a shaft passing through bearing apertures in certain of the strips adjacent one end of the inductance, an enlargement on the shaft between two of the strips, one of the strips being split to provide a flexible member engaging said enlargement to yieldingly retard shaft rotation, and a second inductance on the shaft in adjustable inductive relation to the inductance first mentioned.

29. Inductance apparatus of the class described, comprising spaced supporting strips of dielectric material, an inductance supported thereby, a shaft of dielectric material passing through bearing apertures in certain of the strips adjacent one end of the inductance, an enlargement on the shaft between two of the strips, one of the strips being split to provide a flexible member engaging said enlargement to yieldingly retard shaft rotation, and a second inductance on the shaft in adjustable inductive relation to the inductance first mentioned.

Signed at New York city, in the county of New York and State of New York this 16 day of September A. D. 1924.

LEWIS A. MORRISON.